July 5, 1949.
P. ZAKEL
2,475,301
BANK SCRAPING INSTRUMENTALITIES
FOR CARRYING SCRAPERS
Original Filed July 10, 1945
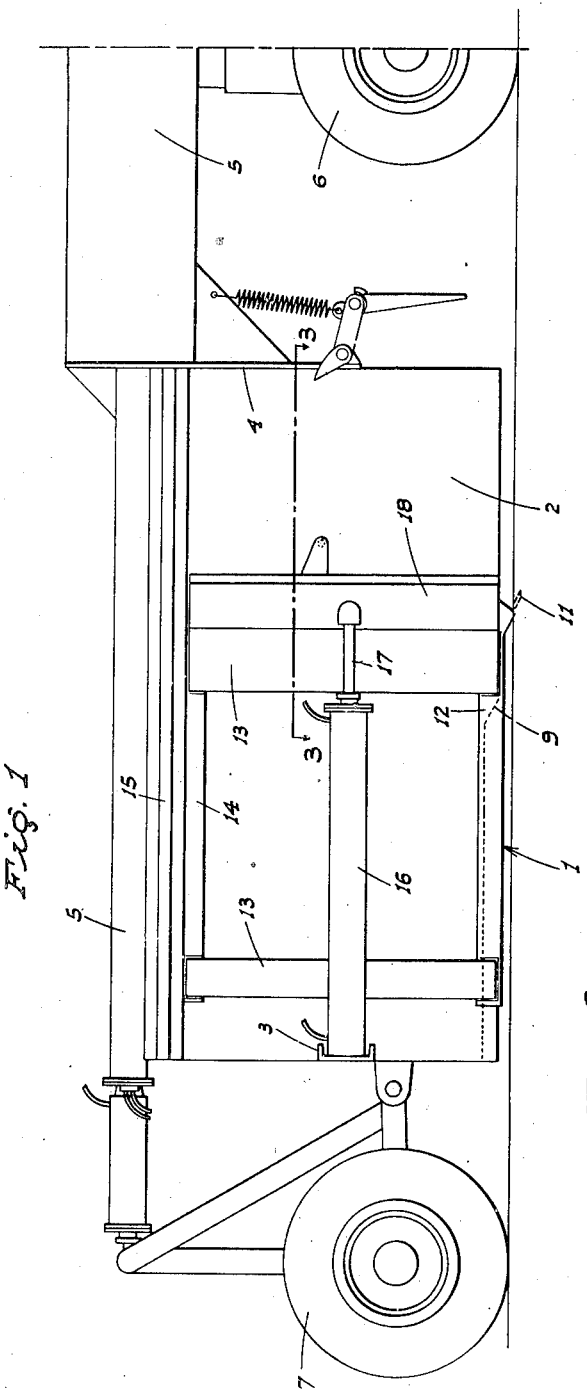
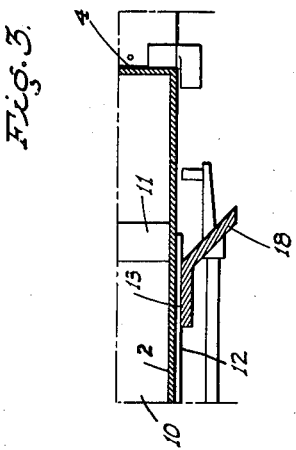
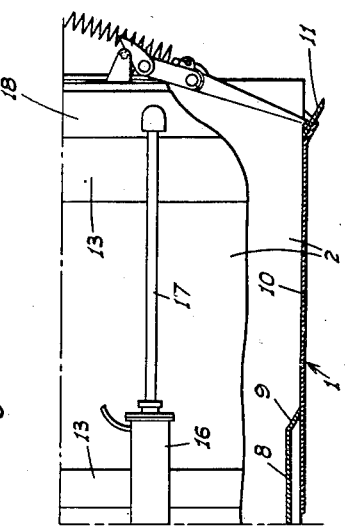
INVENTOR
Paul Zakel
BY
ATTORNEYS Patented July 5, 1949

2,475,301

UNITED STATES PATENT OFFICE 2,475,301

BANK SCRAPING INSTRUMENTALITY FOR CARRYING SCRAPERS

Paul Zakel, Stockton, Calif.

Original application July 10, 1945, Serial No. 604,211. Divided and this application June 28, 1947, Serial No. 757,877

1 Claim. (Cl. 37—141)

This invention relates in general to earth working machines, and in particular the invention embraces improvements in carrying scrapers, especially of the type shown in the J. S. Walch U. S. Patent No. 2,179,532, dated November 14, 1939.

This application is a division of application, Serial No. 604,211, filed July 10, 1945, now Patent No. 2,425,664 dated August 12, 1947.

The object of the invention is to provide, on opposite sides of the bowl, upstanding laterally projecting travelling blades for scraping sides of banks or the like; such blades also moving co-incidentally with the movable bottom of the shovel plate and functioning as guards for the forward end of the power cylinders mounted on the sides of the bowl to actuate such movable bottom or shovel plate.

These objects are accomplished by means of such structure and relative arrangement of parts as will fully appear by a perusal of the following specification and claim.

In the drawings:

Figure 1 is a side elevation of a carrying scraper embodying the present invention.

Figure 2 is a fragmentary longitudinal elevation, partly broken away, showing the shovel plate and blades advanced.

Figure 3 is a fragmentary sectional plan on line 3—3 of Fig. 1.

Referring now more particularly to the characters of reference on the drawings, the scraper comprises a box-like bowl, indicated generally at 1, and which bowl includes elongated but rectangular side plates 2 connected at the back by means including cross beams 3. At the front the side plates are connected by a cross plate 4 extending about half way down from the top.

At the forward end, adjacent the top and centrally thereof, the bowl 1 is fixed in connection with a forwardly projecting, rigid draft neck 5. At its forward end the draft neck 5 is coupled to the rear end of a tractor 6 in any desired manner, and at its rear end the bowl is supported on ground engaging wheels 7.

Suitable means are provided for raising and lowering the front and rear ends of the scraper bowl. These, however, form no part of the present invention and are, therefore, not described but would be preferably that structure shown and described in said application, Serial No. 604,211.

The bowl 1 also includes a bottom plate 8 which extends forwardly from the rear end of said bowl to a termination intermediate the ends thereof in a short downwardly sloping apron 9. This bottom plate 8, and the adjacent portions of the side plates 2, form a fixed dirt retaining portion of the bowl. Disposed at a level immediately below the apron 9 is a longitudinally movable bottom or shovel plate 10 which terminates at its forward end in a downwardly sloping scraping or earth digging blade 11 which extends the full width of the bowl. The unit of plate 10 and blade 11 may be termed the movable bottom or shovel plate of the implement.

The plates 8 and 10 are substantially the same length, and the shovel plate 10 is mounted for sliding movement from a retracted position beneath the bottom plate 8, at which time the forward end portion of the bowl is bottomless, to an advanced position, as shown in Fig. 2, to provide a bottom for said forward portion of the bowl. The shovel plate 10 is mounted for such movement as follows:

At its side edges the shovel plate 10 is formed with upturned flanges 12 which ride outside the side plates 2. Said flanges are connected, at opposite ends, by upstanding suspension plates 13 attached, at their upper ends, to horizontal, longitudinally movable rails 14 carried in guide channels 15 fixed on and extending along the side plates 2. Fluid pressure actuated power cylinders 16 are disposed on opposite sides of the bowl 1 and are connected at one end to the cross beam 3. The operating piston rods 17 of these cylinders are connected to the backs of vertically upstanding, laterally projecting, and forwardly inclined scraper blades 18. Thus upon operation of the cylinders 16 the piston rods 17 forcefully move the blades 18 and the shovel plate 10 forwardly or backwardly. These projecting blades 18 are useful for the dual purpose of trimming the sides of banks or the like upon forward movement of the scraper and, being ahead of the power cylinders 16 and piston rods 17, they also act as forward guards to prevent these latter ends from being injured by possible contact with the banks or other obstructions.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described the invention, the fol- lowing is claimed as new and useful, and upon which Letters Patent is desired:

In combination with a scraper which includes a wheel mounted body having side plates, a fixed plate covering part of the bottom of the body, and a movable plate operable to be moved to selectively cover or uncover the balance of the bottom of the body; a pair of vertically upstanding, laterally projecting and forwardly inclined scraper blades fixed to the movable bottom plate and lying adjacent the outside of the side plates, power means fixed to the side plates back of the blades, and push rods connected with the power means and the back of the blades, the power means being operable to effect movement of the rods to impart movement to the blades and movable bottom plate.

PAUL ZAKEL.

REFERENCES CITED

The following references are of record in the file of this patent:

UNITED STATES PATENTS

| Number | Name | Date |
|---|---|---|
| 514,645 | Davy | Feb. 13, 1894 |
| 2,004,637 | Schauer | June 11, 1935 |
| 2,179,532 | Walch | Nov. 14, 1939 |